July 7, 1942.  I. B. CHITTENDEN  2,288,682
AUTOMATIC FRUIT PICKER
Filed Jan. 23, 1941  4 Sheets-Sheet 1

IRVING B. CHITTENDEN
INVENTOR.

BY
ATTORNEY.

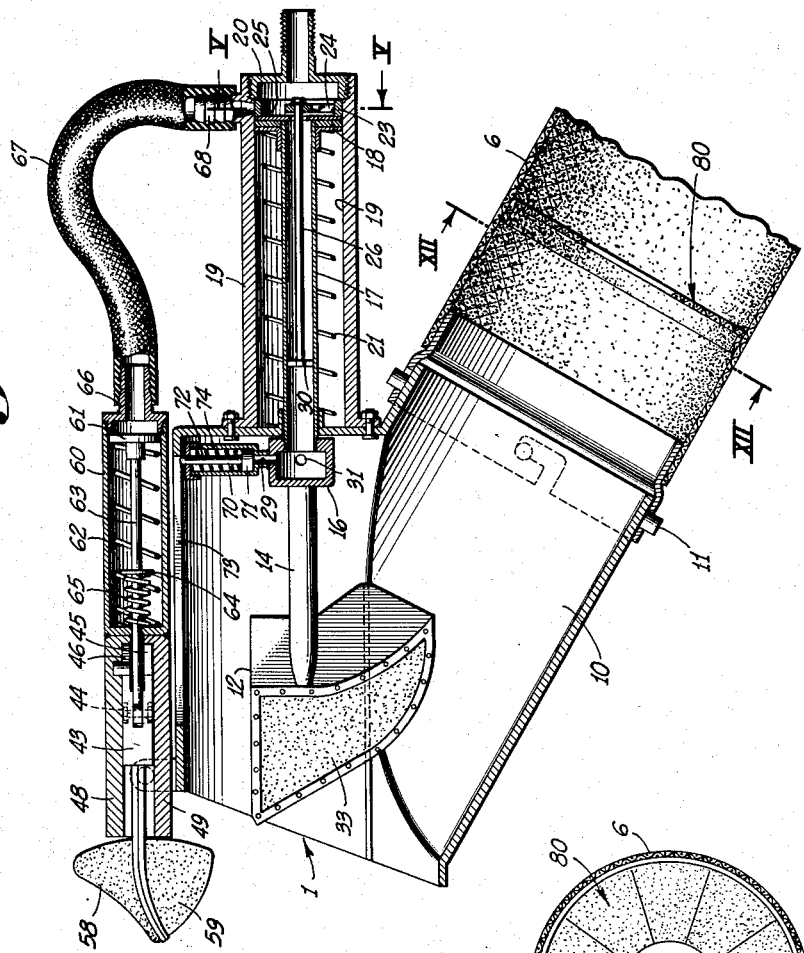

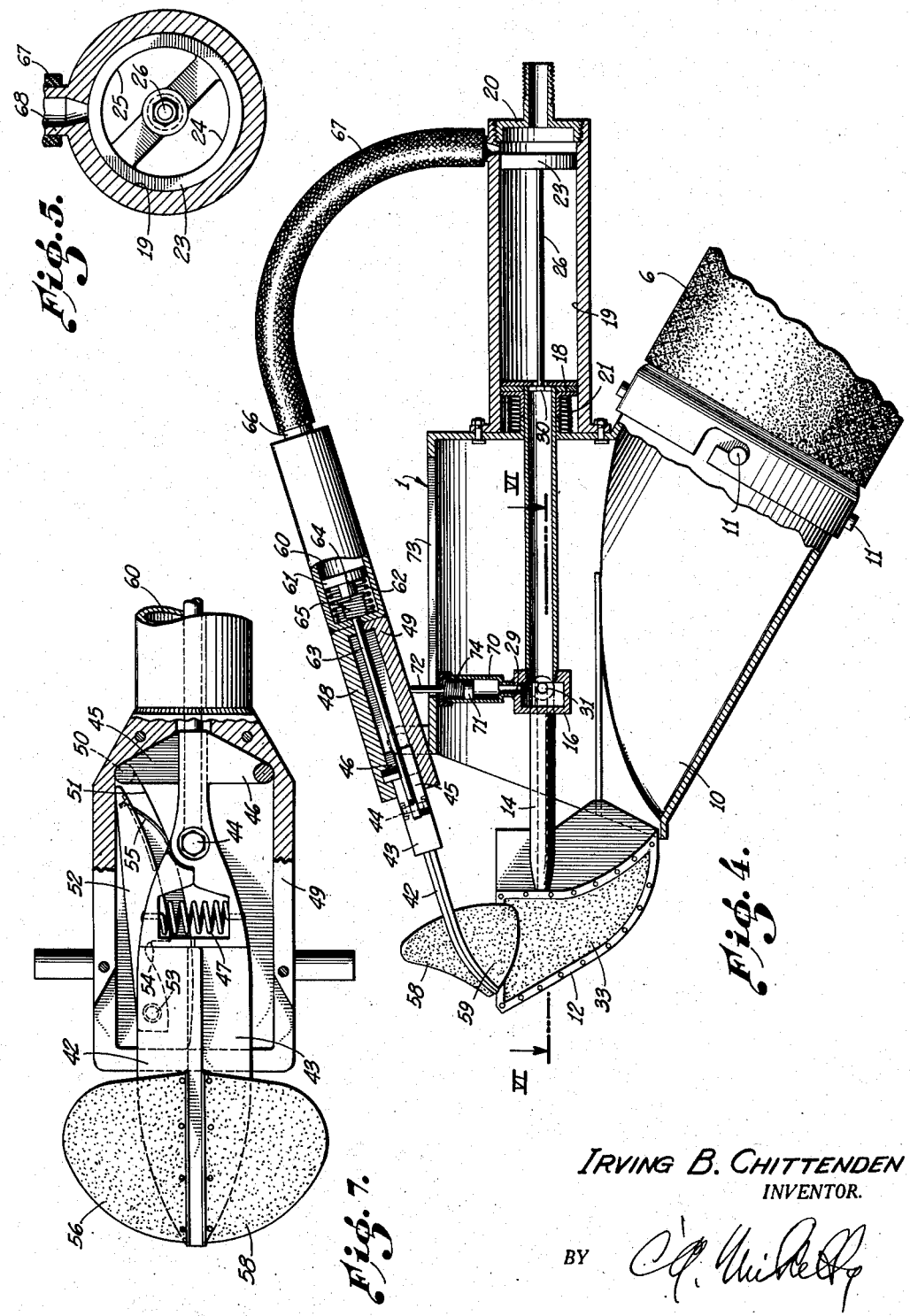

July 7, 1942.  I. B. CHITTENDEN  2,288,682
AUTOMATIC FRUIT PICKER
Filed Jan. 23, 1941  4 Sheets—Sheet 4
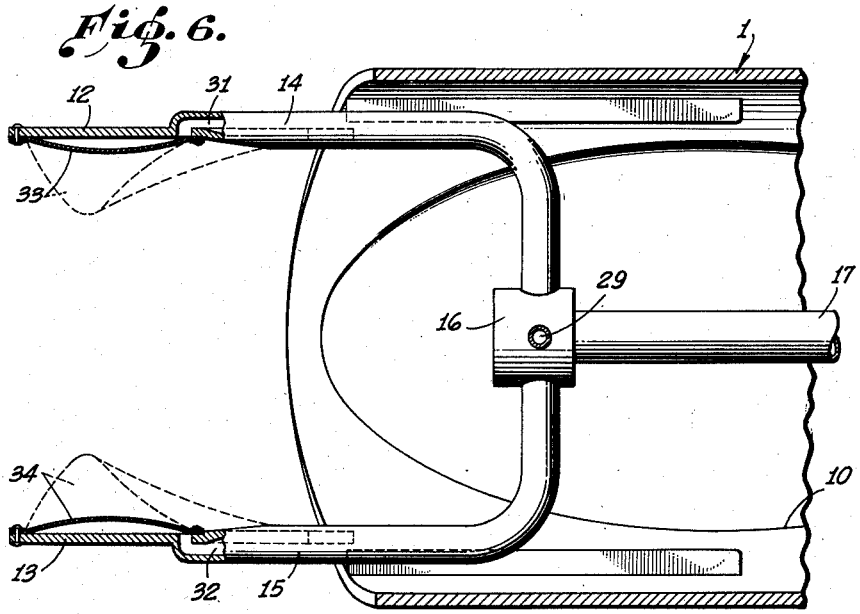
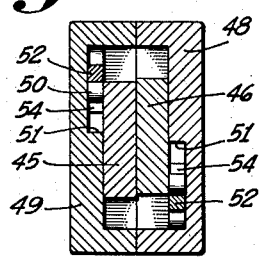
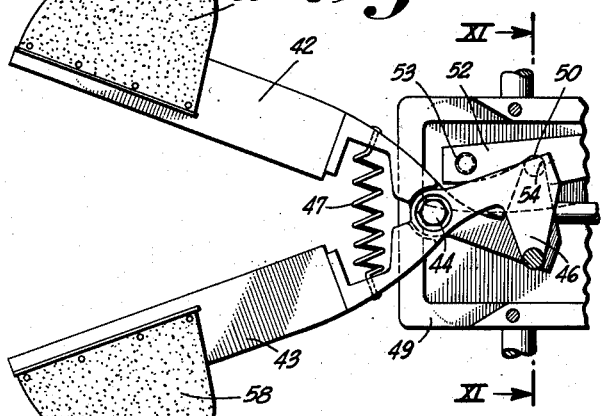
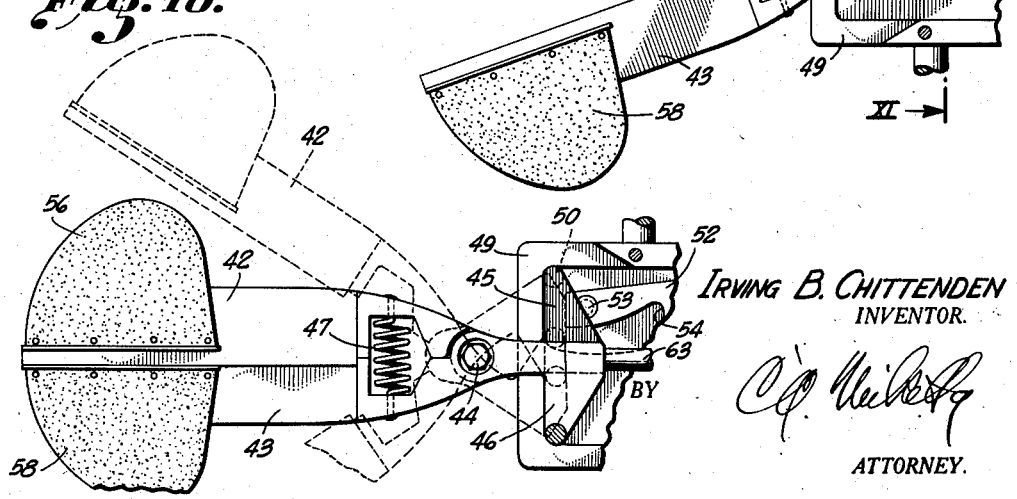
IRVING B. CHITTENDEN
INVENTOR.
ATTORNEY.

Patented July 7, 1942

2,288,682

UNITED STATES PATENT OFFICE 2,288,682

AUTOMATIC FRUIT PICKER

Irving B. Chittenden, Pasadena, Calif.

Application January 23, 1941, Serial No. 375,644

16 Claims. (Cl. 56—334)

This invention relates to automatic devices adapted for use in the picking of various fruit such as apples, pears, peaches, plums, avocados, citrus fruit, etc. More particularly, the present invention is directed to a portable apparatus capable of being directed into the foliage of trees for the purpose of clipping, cutting and picking fruit and in conveying the same to a crate, box or other container, said device being preferably actuated by fluid pressure.

It is well known that one of the most expensive and time-consuming operations which needs be performed in the fruit industry is the picking of the fruit. Many varieties of fruit are relatively delicate and must be handled carefully. Moreover, some of the trees are high and much time is consumed in setting up ladders and scaffolds so as to permit the pickers to come within reaching distance of the fruit. Such pickers collect fruit in bags and then transfer the contents of such bags to field crates or other containers in which the fruit is then taken to packing sheds, canneries, or the like. Time is consumed in manually carrying the fruit from the trees to the field crates.

The present invention permits large quantities of fruit to be picked rapidly and includes means whereby the fruit is conveyed from the tree to a field crate or other container by gravity and without injury to the fruit. The picker may therefore work more consistently and continuously without periodically discontinuing the picking operation while he carries the fruit to a crate, truck or other container.

Generally stated, the apparatus of the present invention comprises a picking head adapted to be mounted on a handle, the handle being of an adjustable length so as to permit a picker to operate at various levels. The picking head preferably includes an outwardly movable or extensible carriage adapted to receive a fruit, and a cutting shears. The cutting shears and the extensible carriage may be operated by fluid pressure means, a valve for the control of such pressure means being located on the handle and subject to the control of the picker or operator. In a more elaborate form of the invention, the cutting shears may tilt downwardly in timed relation with the movement of the carriage so as to cause the shears to cut the stem of the fruit at a point closely adjacent to the surface of the fruit. This tilting operation is of particular value whenever citrus fruit are being picked since it is highly desirable that the stem of citrus fruit be severed at a point closely adjacent to the button so as to prevent the fruit from injuring each other in the crates or containers into which they are placed.

Moreover, the carriage may be provided with inwardly expansible means on each side thereof, these expansible means being actuated in timed relation to the movement of the carriage and of the shears for the purpose of yieldingly grasping and holding the fruit during the picking operation. Moreover, the picking head may be provided with a port and a conduit attached thereto, the conduit being adapted to convey the fruit to a box, crate or other container. In order to prevent the fruit from moving through the conduit at a speed sufficient to injure the same, elastic or resilient baffles, fingers or other means may be provided within such conduit for the purpose of restraining the downward movement of the fruit and in simultaneously wiping the fruit so that it reaches the container in perfect condition.

An object of the present invention, therefore, is to disclose and provide improved automatic fruit picking devices and means.

A further object of the invention is to disclose and provide automatic fruit picking devices actuated by fluid pressure.

A still further object of the present invention is to disclose and provide automatic fluid pressure actuated portable, light weight fruit picking devices.

Other objects, uses and advantages of the invention will become apparent to those skilled in the art from the following description of certain exemplary forms thereof. In order to facilitate understanding, reference will be had to the appended drawings, in which:

Fig. 3 is a vertical section taken along the plane III—III of Fig. 2.

Fig. 4 is a similar vertical section taken of the device at a different stage in its operation.

Fig. 5 is a transverse section along the plane V—V of Fig. 3.

Fig. 6 is a horizontal section taken approximately along the plane VI—VI of Fig. 4.

Fig. 7 is an enlarged plan view of the shears.

Fig. 8 is a front view of the shears.

Figs. 9 and 10 are views of the shears in different positions, the top of the shear case being removed.

Fig. 11 is a transverse section taken through the shears along the plane XI—XI of Fig. 9.

Fig. 12 is a section taken along the plane XII—XII of Fig. 3.

Figure 1:
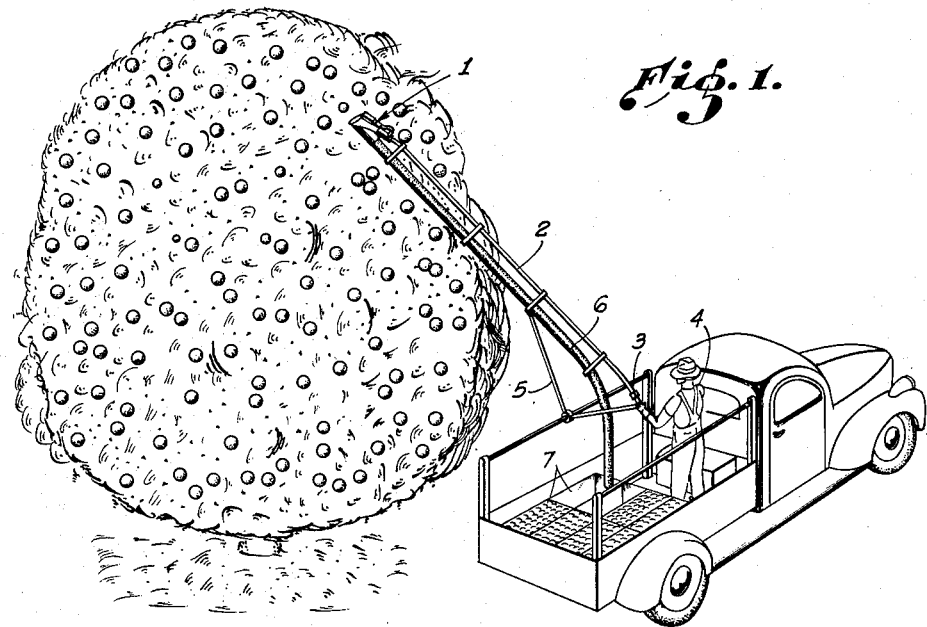
Fig. 1 is a perspective view of one form of device in operation.

Fig. 1 illustrates one embodiment of the device in actual use. The head of the fruit picker is generally indicated at 1 and is mounted upon the end of a handle 2 which is provided with a valve 3 under the control of the operator 4. The handle 2 may be in the form of a pipe provided with pressure fluid from any suitable source as, for example, an air receiver charged with compressed air by a compressor. The compressor and air receiver are not shown but may be carried by the truck illustrated. In Fig. 1 a long handle is shown and for such operations the handle 2 may be provided with a suitable rest 5. A fruit discharge conduit is indicated at 6, this conduit leading to boxes or crates 7 carried by the truck. The picking head 1 is operated by manipulation of the valve 3, the operator directing the picking head into close proximity with a selected fruit and then actuating the handle to cause the fruit picker to operate.

Figure 2:
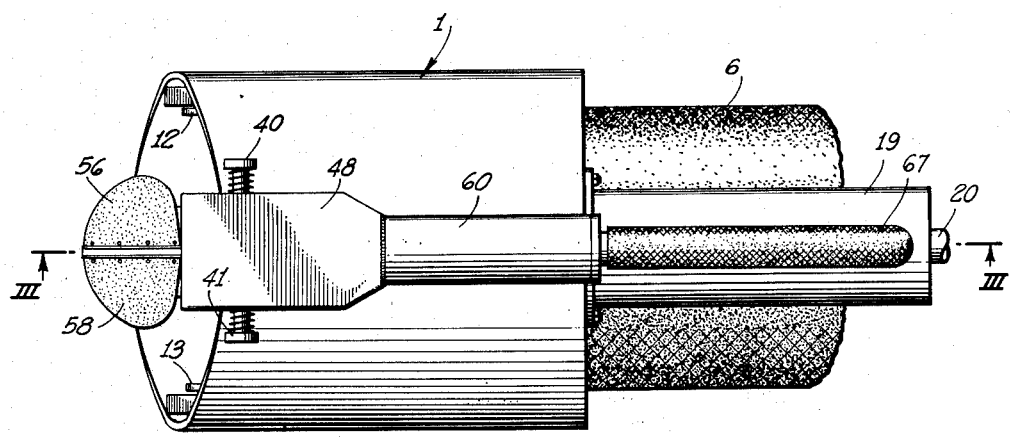
Fig. 2 is a plan view of the device.

As shown in Figs. 2 and 3, the picking head 1 is provided with a port 10 and means for attaching the discharge conduit 6 to such port. Such means may include an outwardly extending ring or a plurality of pins 11 to which the discharge conduit 6 is attached in any suitable manner, or such attaching means may include snaps, buttons, a bayonet joint, a fitting or the like.

An outwardly extensible carriage is carried by the picking head 1, such carriage including side members 12 and 13 maintained in spaced relation by means of arms 14 and 15, the rear portion of said arms being bent toward each other and connected to a housing 16. The housing 16 is connected to a hollow tubular piston rod 17 provided with a piston 18 adapted to move in the cylinder 19 which is attached to the head 1. The end of the cylinder 19 is closed by means of a fitting 20 to which the pipe 2 is attached. It is to be noted that the end of piston rod 17 is open. A spring 21 is positioned within the cylinder 19 and ordinarily bears against the inner side of the piston 18 so as to maintain the carriage in a retracted position. While in such retracted position the piston 18 abuts the edges of a secondary plunger 23 in the form of a spider provided with ports 24 and 25, such plunger 23 being mounted upon a rod 26 extending through the hollow piston rod 17. Mounted upon the rod 26 is a ported spider 30 slidable within the hollow piston rod 17 and adapted to be engaged by the inwardly extending lips of the rod 17 at the piston end thereof, when said rod 17 is almost completely extended toward the left of Fig. 3.

Ports 31 and 32 communicate the housing 16 with the hollow arms 14 and 15 respectively. The plates or side members 12 and 13 carried by the arms 14 and 15 are preferably provided with inwardly expansible fruit holding means. One form of such inwardly expansible means, illustrated in the drawings, comprises the resilient membranes 33 and 34 attached to the plates 12 and 13, the space between the plates and such resilient membrances being in communication with the hollow arms 14 and 15 respectively.

It will be understood that when pressure fluid is admitted through the line 2 into the cylinder 19, the auxiliary plunger 23 does not close the opening into the hollow piston rod 17 so that the pressure fluid can move piston 18, piston rod 17 and housing 16 outwardly. The spider 30 offers some resistance to the passage of pressure fluid. The carriage is thus moved outwardly so as to embrace a desired fruit. After the piston 18 has moved so as to cause the inwardly extending lips at the piston end of the rod 17 to engage the spider 30, the spider 30, rod 26 and piston 23 are moved outwardly. Pressure fluid will then pass through the ports of the auxiliary plunger 23 into the hollow piston rod 17 through the spider 30 and into the ports 29, 31 and 32, thereby supplying pressure fluid through the arms 14 and 15 to the space beneath the membrances 33 and 34, causing such membrances to expand inwardly and yieldingly grasp a fruit, or prevent fruit from rolling out of the carriage in any direction other than downwardly through conduit 6.

Attention is here called to the fact that the membranes 33 and 34 are preferably triangular in shape and wider at the top than at the bottom so that a more extensive enlargement may take place in the upper portion than in the lower portion, thereby not only grasping a fruit but simultaneously exerting a downward pressure upon the fruit toward the bottom of the picker. It is also to be noted that fruit differing in size within relatively wide limits may be picked by a single device, the inwardly extensible character of the membranes functioning to prevent the fruit from falling out of the device even though such fruit differs materially in size.

The shears and their actuating mechanism may be pivotally mounted on the top of the picker 1 as in trunnions 40 and 41. The cutting elements of the shears are indicated at 42 and 43, pivotally connected together at 44, the shear 42 having an actuating crank arm 45 and the shear 43 having the actuating arm 46. Means may be provided for normally maintaining the shears in a closed position, as, for example, a tension spring 47 retained within opposing hollows or cavities in the body of the shears 42 and 43, the ends of the spring 47 being connected to the two movable shear portions. These shears are mounted within a shear case having upper and lower elements 48 and 49, the shear case being pivoted in the trunnions 40 and 41 for tilting movement. Each portion of the shear case is provided with a substantially triangular camway adapted to receive a pin extending from the actuating arm 45 or 46 of the shear. A pin 50 is shown depending from the actuating arm 45 and is adapted to be slidably received within the camway 51. A frog 52 is pivoted within the camway 51 as at 53 and is provided with a recess 54 adapted to receive the pin 50. A spring 55 normally maintains the frog 52 in the position indicated in Fig. 6. A similar camway, frog, etc., is provided in the upper portion 48 of the shear case and cooperates with an upstanding pin carried by the arm 46.

Connected to the shear case is a cylinder 60 provided with a piston 61. A compression spring 62 is mounted within the cylinder and bears against the piston 61. The piston 61 is attached to a shear actuating rod 63 which is connected to the bolt 44 joining the two movable shear elements 42 and 43. Slidably mounted upon the rod 63 is a plate 64 with a compression spring 65 connected thereto. The spring 65 may be of slightly greater strength than the spring 62.

The end of cylinder 60 is provided with a fitting 66 having a nipple adapted to be connected as by means of the flexible hose 67 to a nipple 68 carried by the cylinder 19, the nipple 68 being in communication with the interior of cylinder 19 at a point normally obstructed by the auxiliary plunger 23 described hereinbefore.

During the operation, when pressure fluid enters the end of cylinder 60 through the nipple 66, piston 61 will be moved outwardly together with actuating rod 63. Since this rod is attached to the bolt 44, the shears 42 and 43 will move outwardly. During such outward movement the shears will open since the pins carried by the actuating arms 45 and 46 will move inwardly along the keyway 51 until the notch 54 is reached, whereupon the shears will collapse slightly and remain in position. The piston 61 will then approach the plate 64 and additional pressure fluid through the nipple 66 will overcome the added pressure of the spring 65, forcing the actuating pins into the transverse channel of the camway 51, whereupon the shears will rapidly close under the influence of the connecting tension spring 47, thereby moving the shear elements 42 and 43 together and severing the stem of the fruit. As soon as the supply of fluid pressure through nipple 66 is discontinued, the shear will return to its normal position under the influence of springs 62 and 65.

In some instances it is highly desirable that the outer ends of the shears be curved so as to conform in part at least to the contour of the fruit adjacent the stem. Moreover, in order to prevent the shears from injuring fruit adjacent the one being picked, each of the shear elements may be provided with fins or guards such as, for example, the guards 56, 57, 58 and 59, these being curved pieces of resilient or elastic material such as rubber or rubber composition, attached to the upper and lower surfaces of the shears.

The shear tilting mechanism may comprise a cylinder 70 carried by the housing 16, connected thereto by the port 29. Mounted within the cylinder 70 is a small piston 71 having an upstanding stem 72 extending upwardly into a slot 73 formed in the picking head 1 immediately below the shear case and shear actuating cylinder 60 and rearwardly of the point of pivotal suspension of the shear case. The piston 71 is normally in a retracted position due to the pressure of a spring 74 carried within the cylinder 70. It will be evident that fluid pressure may enter the cylinder 70 through port 29 and move the piston 71 against the spring 74, causing the stem 72 to bear against the lower portion of the shear case and pivot the same so as to move the shears downwardly against a fruit. By suitable selection and control of the strength of springs 21, 74, 62 and 65 and by regulating the size of port 29, the tilting movement of the shears is caused to take place in timed relation with the outward movement of the carriage and in timed relation with the opening and closing of the shears.

The fruit discharge conduit 6, mentioned hereinbefore, may be made of any suitable fabric or other composition and is preferably sufficiently limp or flexible so as to permit relative movement between the picker and the lower portion of the discharge conduit 6. It is to be understood that after fruit has been severed from its stem, it will roll down the lower inclined surfaces of the picking head into the conduit 6 and follow said conduit to the ground or lower discharge point under the influence of gravity. In order to prevent unrestrained and forceful movement of the fruit through the conduit 6, baffles, such as the baffle 80, may be provided within the conduit. In the form illustrated, the baffles are in the form of annular rings of elastic or resilient material such as, for example, sheet rubber connected to the inner surfaces of the conduit 6, each of the annular rings 80 being provided with an aperture 81 somewhat smaller than the fruit being picked. Radial or spiral cuts 82, 83, and the like may be formed in the ring 80, such cuts extending outwardly from the aperture 81 so as to form a plurality of inwardly extending fingers caressing the fruit as it goes down the conduit.

As previously stated, the timed operation of the device may be controlled by proper selection of spring strengths. In one embodiment of this invention the spring 21 was capable of exerting a pressure of only 2 to 3 pounds, spring 74 was reactive to a pressure of 5 to 7 pounds, spring 62 to a similar pressure of 5 to 7 pounds, whereas the spring 65 was compressed under a pressure of between 7 and 10 pounds. It is to be remembered that all of the pressure fluid supplied to the device through the nipple 20 and line 2 is under the control of the operator and valve 3. Valve 3 either admits pressure through line 2 into the device or it permits a release of pressure from the device into the atmosphere. Substantially all air or other pressure fluid from the device is therefore liberated and discharged under the influence of the various springs at the completion of an operation.

The timed relation of the various movements of the device may also be partially controlled by regulating the diameter or size of the apertures leading into the arms 14 and 15, such as the ports or apertures 31, thereby preventing excessive pressures from unduly distorting the membrane 33. Resilient fingers may be carried by the rear frame of the side plates 12, said fingers extending over the rear portion of the flexible membrane 33 so as to assure the expansion of such membrane into the triangular shape indicated in Fig. 6 by dotted lines.

It is to be understood that numerous changes and modifications may be made in the device. The admission of pressure fluid into the arms 14 and 15 of the carriage and into the cylinder 70 of the tilting mechanism may be controlled by means of a slide valve within the housing 16.

These and other changes may be made without departing from the spirit of the invention or the scope of the claims appended hereto.

I claim:

1. An automatic fluid-pressure actuated fruit picker comprising: a picking head adapted to be mounted on a handle, said head including a carriage mounted thereon, said carriage being outwardly extensible and including spaced side members adapted to receive a fruit, a cylinder carried by the head, a piston in said cylinder and connected to the carriage for controlling the movement of the carriage, cutting shears mounted on the head above the carriage, a cylinder and piston carried by the head for actuating said shears, a fruit discharge port in said head, and means for supplying fluid pressure to said cylinders.

2. An automatic fluid-pressure actuated fruit picker comprising: a picking head adapted to be mounted on a handle, said head including a carriage mounted thereon, said carriage being outwardly extensible and including spaced side members adapted to receive a fruit, inwardly expandable means on each side member of the carriage, a cylinder carried by the head, a piston in said cylinder and connected to the carriage for controlling the movement of the carriage, cutting shears mounted on the head above the carriage, a cylinder and piston carried by the head, said piston being connected to the shears for actuating said shears, a fruit discharge port in said head, and means for supplying fluid pressure to said cylinders.

3. An automatic fluid-pressure actuated fruit picker comprising: a picking head adapted to be mounted on a handle, said head including a carriage mounted thereon, said carriage being outwardly extensible and including spaced side members adapted to receive a fruit, a cylinder carried by the head, a piston in said cylinder and connected to the carriage for controlling the movement of the carriage, cutting shears mounted on the head above the carriage, a cylinder and piston carried by the head, said piston being attached to and adapted for actuating said shears, means for tilting the shears, a fruit discharge port in said head, and means for supplying fluid pressure to said cylinders.

4. An automatic fluid-pressure actuated fruit picker comprising: a picking head adapted to be mounted on a handle, said head including a carriage mounted thereon, said carriage being outwardly extensible and including spaced side members adapted to receive a fruit, a cylinder carried by the head, a piston in said cylinder and connected to the carriage for controlling the movement of the carriage, cutting shears mounted on the head above the carriage, a cylinder and piston carried by the head for actuating said shears, a fruit discharge port in said head, a discharge conduit attached to said port, said conduit having yielding internally extending baffles, and valved means for controlling supply of fluid pressure to the cylinders.

5. An automatic fluid-pressure actuated fruit picker comprising: a picking head adapted to be mounted on a handle, said head including an outwardly extensible carriage adapted to receive a fruit, fluid-pressure actuated means carried by the head for controlling the movement of the carriage, cutting shears mounted on the picking head above said carriage, fluid-pressure actuated means carried by the head for actuating said shears, and valved means for controlling the supply of fluid pressure to said cylinders.

6. In a device of the character described in claim 5, the provision of means, carried by the picking head, for tilting the shears in timed relation with the movement of the carriage.

7. In a device of the character described in claim 5, the provision of fluid-pressure actuated means, carried by the picking head, for tilting the shears in timed relation to the shear actuating means.

8. In a device of the character described in claim 5, the further provision of a fruit discharge port in said picking head, and a discharge conduit having internally extending yieldable baffles, attached to said port.

9. In a device of the character described in claim 5, the further provision of fluid-pressure actuated inwardly expandable opposing means on each side of the carriage.

10. In an automatic fluid-pressure actuated fruit picker, a picking head adapted to be mounted on a handle, said head including means adapted to receive a fruit, cutting shears mounted on said head above the fruit receiving means, and a cylinder and piston means for actuating said shears.

11. In an automatic fluid-pressure actuated fruit picker, a picking head adapted to be mounted on a handle, said head including means adapted to receive a fruit, cutting shears mounted on said head above the fruit receiving means, and fluid pressure means carried by the head for actuating said shears, said shears being provided with curved yielding guards adapted to prevent said shears from injuring the fruit being picked.

12. In an automatic fluid-pressure-actuated fruit picker, a picking head adapted to be mounted on a handle, said head including means adapted to receive a fruit, cutting shears mounted on said head, a cylinder and piston means for actuating said shears, and fluid pressure actuated means for tilting the shears before said shears close in a cutting action.

13. An automatic fluid-pressure actuated fruit picker comprising: a picking head adapted to be mounted on a handle, said head including a carriage mounted thereon, said carriage being outwardly extensible, a cylinder carried by the head, a piston slidably mounted in the cylinder and connected to said carriage for controlling the movement of the carriage, cutting shears mounted on the picking head above the carriage, a second cylinder carried by the head, a piston slidably mounted in said second cylinder and connected to said shears for actuating the same, and valved means for controlling the supply of fluid pressure to said cylinders.

14. An automatic fluid-pressure actuated fruit picker comprising: a picking head adapted to be mounted on a handle, said head including a carriage mounted thereon, said carriage being outwardly extensible, a cylinder carried by the head, a piston slidably mounted in the cylinder and connected to said carriage for controlling the movement of the carriage, cutting shears mounted on the picking head above the carriage, a second cylinder carried by the head, a piston slidably mounted in said second cylinder and connected to said shears for actuating the same, valved means for controlling the supply of fluid pressure to said cylinders, and spring means cooperating with the said pistons for returning the same to initial position when the supply of fluid pressure is discontinued.

15. An automatic fluid-pressure actuated fruit picker comprising: a picking head adapted to be mounted on a handle, said head including a carriage mounted thereon, said carriage being outwardly extensible, said carriage being provided with spaced side members provided with opposing yieldable means, a cylinder carried by the head, a piston slidably mounted in the cylinder and connected to said carriage for controlling the movement of the carriage, cutting shears mounted on the picking head above the carriage, a second cylinder carried by the head, a piston slidably mounted in said second cylinder and connected to said shears for actuating the same, and valved means for controlling the supply of fluid pressure to said cylinders.

16. An automatic fluid-pressure actuated fruit picker comprising: a picking head adapted to be mounted on a handle, said head including a carriage mounted thereon, said carriage being outwardly extensible, a cylinder carried by the head, a piston slidably mounted in the cylinder and connected to said carriage for controlling the movement of the carriage, cutting shears pivotally mounted on the picking head above said carriage, fluid-pressure actuated means associated with said cutting shears for operating said shears, fluid-pressure actuated means for tilting the shears in timed relation with the movement of the carriage, and valved means for controlling the supply of fluid pressure to said cylinder and fluid-pressure actuated means.

IRVING B. CHITTENDEN.